(12) United States Patent
Mellott et al.

(10) Patent No.: US 11,244,264 B2
(45) Date of Patent: Feb. 8, 2022

(54) INTERLEAVING SURPRISE ACTIVITIES IN WORKFLOW

(71) Applicant: Hand Held Products, Inc., Fort Mill, SC (US)

(72) Inventors: Mark Mellott, Pittsburgh, PA (US); Heather Viszlay, Glenshaw, PA (US); John Pecorari, Harrison City, PA (US); Mark David Murawski, Pittsburgh, PA (US); Justin Volz, Verona, PA (US); George J. Karabin, Pittsburgh, PA (US)

(73) Assignee: Hand Held Products, Inc., Fort Mill, SC (US)

( * ) Notice: Subject to any disclaimer, the term of this patent is extended or adjusted under 35 U.S.C. 154(b) by 780 days.

(21) Appl. No.: 14/977,907

(22) Filed: Dec. 22, 2015

(65) Prior Publication Data

US 2016/0189076 A1    Jun. 30, 2016

Related U.S. Application Data

(60) Provisional application No. 62/097,367, filed on Dec. 29, 2014.

(51) Int. Cl.
*G06Q 10/06* (2012.01)
*G06Q 10/04* (2012.01)
*G06Q 10/08* (2012.01)

(52) U.S. Cl.
CPC . *G06Q 10/06316* (2013.01); *G06Q 10/06312* (2013.01); *G06Q 10/063112* (2013.01);
(Continued)

(58) Field of Classification Search
CPC ...... G06Q 10/04; G06Q 10/047; G06Q 10/06; G06Q 10/063; G06Q 10/0631;
(Continued)

(56) References Cited

U.S. PATENT DOCUMENTS

| 5,956,330 A | 9/1999 | Kerns |
| 6,092,095 A | 7/2000 | Maytal |

(Continued)

FOREIGN PATENT DOCUMENTS

| WO | WO-2010076774 A1 * | 7/2010 | ............ G06Q 10/06 |
| WO | 2013163789 A1 | 11/2013 | |

(Continued)

OTHER PUBLICATIONS

Y. Pasharibu, F. Jie, J. Jacobs and A. Punturiero, "Better improvement management to overcome inventory, transportation, and unnecessary motion waste in retail stores," 2014 IEEE International Conference on Management of Innovation and Technology, 2014, pp. 531-536 (Year: 2014).*

(Continued)

*Primary Examiner* — Rutao Wu
*Assistant Examiner* — Sarjit S Bains
(74) *Attorney, Agent, or Firm* — Alston & Bird LLP

(57) ABSTRACT

A method includes obtaining primary workflow having a list of activities being performed by a worker; obtaining a surprise activity; comparing a context of the worker to contextual needs of the surprise activity; and interleaving the surprise activity in the list of activities based on a best fit context of the worker.

16 Claims, 5 Drawing Sheets

(52) U.S. Cl.
CPC ........... *G06Q 10/047* (2013.01); *G06Q 10/06* (2013.01); *G06Q 10/063* (2013.01); *G06Q 10/067* (2013.01); *G06Q 10/0631* (2013.01); *G06Q 10/0633* (2013.01); *G06Q 10/06311* (2013.01); *G06Q 10/06313* (2013.01); *G06Q 10/06315* (2013.01); *G06Q 10/063114* (2013.01); *G06Q 10/063116* (2013.01); *G06Q 10/063118* (2013.01); *G06Q 10/08* (2013.01); *G06Q 10/087* (2013.01)

(58) Field of Classification Search
CPC ..... G06Q 10/06311; G06Q 10/063112; G06Q 10/063114; G06Q 10/063116; G06Q 10/063118; G06Q 10/06312; G06Q 10/06313; G06Q 10/06315; G06Q 10/06316; G06Q 10/0633; G06Q 10/067; G06Q 10/08; G06Q 10/087
See application file for complete search history.

(56) References Cited

U.S. PATENT DOCUMENTS

| | | |
|---|---|---|
| 6,457,037 B1 | 9/2002 | Maytal |
| 6,832,725 B2 | 12/2004 | Gardiner et al. |
| 7,128,266 B2 | 10/2006 | Marlton et al. |
| 7,159,783 B2 | 1/2007 | Walczyk et al. |
| 7,413,127 B2 | 8/2008 | Ehrhart et al. |
| 7,726,575 B2 | 6/2010 | Wang et al. |
| 7,769,617 B2* | 8/2010 | Iwasaki .......... G06Q 10/063116 705/7.26 |
| 7,805,327 B1* | 9/2010 | Schulz ............ G06Q 10/06316 705/7.26 |
| 8,294,969 B2 | 10/2012 | Plesko |
| 8,317,105 B2 | 11/2012 | Kotlarsky et al. |
| 8,322,622 B2 | 12/2012 | Suzhou et al. |
| 8,325,036 B1* | 12/2012 | Fuhr ................... G06Q 10/087 340/5.92 |
| 8,366,005 B2 | 2/2013 | Kotlarsky et al. |
| 8,371,507 B2 | 2/2013 | Haggerty et al. |
| 8,376,233 B2 | 2/2013 | Van Horn et al. |
| 8,381,979 B2 | 2/2013 | Franz |
| 8,390,909 B2 | 3/2013 | Plesko |
| 8,408,464 B2 | 4/2013 | Zhu et al. |
| 8,408,468 B2 | 4/2013 | Horn et al. |
| 8,408,469 B2 | 4/2013 | Good |
| 8,424,768 B2 | 4/2013 | Rueblinger et al. |
| 8,448,863 B2 | 5/2013 | Xian et al. |
| 8,457,013 B2 | 6/2013 | Essinger et al. |
| 8,459,557 B2 | 6/2013 | Havens et al. |
| 8,469,272 B2 | 6/2013 | Kearney |
| 8,474,712 B2 | 7/2013 | Kearney et al. |
| 8,479,992 B2 | 7/2013 | Kotlarsky et al. |
| 8,490,877 B2 | 7/2013 | Kearney |
| 8,517,271 B2 | 8/2013 | Kotlarsky et al. |
| 8,523,076 B2 | 9/2013 | Good |
| 8,528,818 B2 | 9/2013 | Ehrhart et al. |
| 8,544,737 B2 | 10/2013 | Gomez et al. |
| 8,548,420 B2 | 10/2013 | Grunow et al. |
| 8,550,335 B2 | 10/2013 | Samek et al. |
| 8,550,354 B2 | 10/2013 | Gannon et al. |
| 8,550,357 B2 | 10/2013 | Kearney |
| 8,556,174 B2 | 10/2013 | Kosecki et al. |
| 8,556,176 B2 | 10/2013 | Van Horn et al. |
| 8,556,177 B2 | 10/2013 | Hussey et al. |
| 8,559,767 B2 | 10/2013 | Barber et al. |
| 8,561,895 B2 | 10/2013 | Gomez et al. |
| 8,561,903 B2 | 10/2013 | Sauerwein |
| 8,561,905 B2 | 10/2013 | Edmonds et al. |
| 8,565,107 B2 | 10/2013 | Pease et al. |
| 8,571,307 B2 | 10/2013 | Li et al. |
| 8,579,200 B2 | 11/2013 | Samek et al. |
| 8,583,924 B2 | 11/2013 | Caballero et al. |
| 8,584,945 B2 | 11/2013 | Wang et al. |
| 8,587,595 B2 | 11/2013 | Wang |
| 8,587,697 B2 | 11/2013 | Hussey et al. |
| 8,588,869 B2 | 11/2013 | Sauerwein et al. |
| 8,590,789 B2 | 11/2013 | Nahill et al. |
| 8,596,539 B2 | 12/2013 | Havens et al. |
| 8,596,542 B2 | 12/2013 | Havens et al. |
| 8,596,543 B2 | 12/2013 | Havens et al. |
| 8,599,271 B2 | 12/2013 | Havens et al. |
| 8,599,957 B2 | 12/2013 | Peake et al. |
| 8,600,158 B2 | 12/2013 | Li et al. |
| 8,600,167 B2 | 12/2013 | Showering |
| 8,602,309 B2 | 12/2013 | Longacre et al. |
| 8,608,053 B2 | 12/2013 | Meier et al. |
| 8,608,071 B2 | 12/2013 | Liu et al. |
| 8,611,309 B2 | 12/2013 | Wang et al. |
| 8,615,487 B2 | 12/2013 | Gomez et al. |
| 8,621,123 B2 | 12/2013 | Caballero |
| 8,622,303 B2 | 1/2014 | Meier et al. |
| 8,628,013 B2 | 1/2014 | Ding |
| 8,628,015 B2 | 1/2014 | Wang et al. |
| 8,628,016 B2 | 1/2014 | Winegar |
| 8,629,926 B2 | 1/2014 | Wang |
| 8,630,491 B2 | 1/2014 | Longacre et al. |
| 8,635,309 B2 | 1/2014 | Berthiaume et al. |
| 8,636,200 B2 | 1/2014 | Kearney |
| 8,636,212 B2 | 1/2014 | Nahill et al. |
| 8,636,215 B2 | 1/2014 | Ding et al. |
| 8,636,224 B2 | 1/2014 | Wang |
| 8,638,806 B2 | 1/2014 | Wang et al. |
| 8,640,958 B2 | 2/2014 | Lu et al. |
| 8,640,960 B2 | 2/2014 | Wang et al. |
| 8,643,717 B2 | 2/2014 | Li et al. |
| 8,646,692 B2 | 2/2014 | Meier et al. |
| 8,646,694 B2 | 2/2014 | Wang et al. |
| 8,657,200 B2 | 2/2014 | Ren et al. |
| 8,659,397 B2 | 2/2014 | Vargo et al. |
| 8,668,149 B2 | 3/2014 | Good |
| 8,678,285 B2 | 3/2014 | Kearney |
| 8,678,286 B2 | 3/2014 | Smith et al. |
| 8,682,077 B1 | 3/2014 | Longacre |
| D702,237 S | 4/2014 | Oberpriller et al. |
| 8,687,282 B2 | 4/2014 | Feng et al. |
| 8,692,927 B2 | 4/2014 | Pease et al. |
| 8,695,880 B2 | 4/2014 | Bremer et al. |
| 8,698,949 B2 | 4/2014 | Grunow et al. |
| 8,702,000 B2 | 4/2014 | Barber et al. |
| 8,717,494 B2 | 5/2014 | Gannon |
| 8,720,783 B2 | 5/2014 | Biss et al. |
| 8,723,804 B2 | 5/2014 | Fletcher et al. |
| 8,723,904 B2 | 5/2014 | Marty et al. |
| 8,727,223 B2 | 5/2014 | Wang |
| 8,740,082 B2 | 6/2014 | Wilz |
| 8,740,085 B2 | 6/2014 | Furlong et al. |
| 8,744,890 B1* | 6/2014 | Bernier .............. G06Q 10/0631 705/7.16 |
| 8,746,563 B2 | 6/2014 | Hennick et al. |
| 8,750,445 B2 | 6/2014 | Peake et al. |
| 8,752,766 B2 | 6/2014 | Xian et al. |
| 8,756,059 B2 | 6/2014 | Braho et al. |
| 8,757,495 B2 | 6/2014 | Qu et al. |
| 8,760,563 B2 | 6/2014 | Koziol et al. |
| 8,736,909 B2 | 7/2014 | Reed et al. |
| 8,763,909 B2 | 7/2014 | Reed et al. |
| 8,777,108 B2 | 7/2014 | Coyle |
| 8,777,109 B2 | 7/2014 | Oberpriller et al. |
| 8,779,898 B2 | 7/2014 | Havens et al. |
| 8,781,520 B2 | 7/2014 | Payne et al. |
| 8,783,573 B2 | 7/2014 | Havens et al. |
| 8,789,757 B2 | 7/2014 | Barten |
| 8,789,758 B2 | 7/2014 | Hawley et al. |
| 8,789,759 B2 | 7/2014 | Xian et al. |
| 8,794,520 B2 | 8/2014 | Wang et al. |
| 8,794,522 B2 | 8/2014 | Ehrhart |
| 8,794,525 B2 | 8/2014 | Amundsen et al. |
| 8,794,526 B2 | 8/2014 | Wang et al. |
| 8,798,367 B2 | 8/2014 | Ellis |
| 8,807,431 B2 | 8/2014 | Wang et al. |
| 8,807,432 B2 | 8/2014 | Van Horn et al. |
| 8,820,630 B2 | 9/2014 | Qu et al. |

(56) References Cited

U.S. PATENT DOCUMENTS

| | | |
|---|---|---|
| 8,822,848 B2 | 9/2014 | Meagher |
| 8,824,692 B2 | 9/2014 | Sheerin et al. |
| 8,824,696 B2 | 9/2014 | Braho |
| 8,842,849 B2 | 9/2014 | Wahl et al. |
| 8,844,822 B2 | 9/2014 | Kotlarsky et al. |
| 8,844,823 B2 | 9/2014 | Fritz et al. |
| 8,849,019 B2 | 9/2014 | Li et al. |
| D716,285 S | 10/2014 | Chaney et al. |
| 8,851,383 B2 | 10/2014 | Yeakley et al. |
| 8,854,633 B2 | 10/2014 | Laffargue |
| 8,866,963 B2 | 10/2014 | Grunow et al. |
| 8,868,421 B2 | 10/2014 | Braho et al. |
| 8,868,519 B2 | 10/2014 | Maloy et al. |
| 8,868,802 B2 | 10/2014 | Barten |
| 8,868,803 B2 | 10/2014 | Bremer et al. |
| 8,870,074 B1 | 10/2014 | Gannon |
| 8,879,639 B2 | 11/2014 | Sauerwein |
| 8,880,426 B2 | 11/2014 | Smith |
| 8,881,983 B2 | 11/2014 | Havens et al. |
| 8,881,987 B2 | 11/2014 | Wang |
| 8,903,172 B2 | 12/2014 | Smith |
| 8,908,995 B2 | 12/2014 | Benos et al. |
| 8,910,870 B2 | 12/2014 | Li et al. |
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,261,398 B2 | 2/2016 | Amundsen et al. |
| 9,262,633 B1 | 2/2016 | Todeschini et al. |
| 9,262,664 B2 | 2/2016 | Soule et al. |
| 9,274,806 B2 | 3/2016 | Barten |
| 9,282,501 B2 | 3/2016 | Wang et al. |
| 9,292,969 B2 | 3/2016 | Laffargue et al. |
| 9,298,667 B2 | 3/2016 | Caballero |
| 9,310,609 B2 | 4/2016 | Rueblinger et al. |
| 9,319,548 B2 | 4/2016 | Showering et al. |
| D757,009 S | 5/2016 | Oberpriller et al. |
| 9,342,724 B2 | 5/2016 | McCloskey |
| 9,342,827 B2 | 5/2016 | Smith |
| 9,355,294 B2 | 5/2016 | Smith et al. |
| 9,367,722 B2 | 6/2016 | Xian et al. |
| 9,375,945 B1 | 6/2016 | Bowles |
| D760,719 S | 7/2016 | Zhou et al. |
| 9,390,596 B1 | 7/2016 | Todeschini |
| 9,396,375 B2 | 7/2016 | Qu et al. |
| 9,398,008 B2 | 7/2016 | Todeschini et al. |
| D762,604 S | 8/2016 | Fitch et al. |
| D762,647 S | 8/2016 | Fitch et al. |
| 9,407,840 B2 | 8/2016 | Wang |
| 9,412,242 B2 | 8/2016 | Van Horn et al. |
| 9,418,252 B2 | 8/2016 | Nahill et al. |
| D766,244 S | 9/2016 | Zhou et al. |
| 9,443,222 B2 | 9/2016 | Singel et al. |
| 9,448,610 B2 | 9/2016 | Davis et al. |
| 9,478,113 B2 | 10/2016 | Xie et al. |
| 9,569,255 B1* | 2/2017 | Johnson ............... G06F 9/4887 |
| 9,582,696 B2 | 2/2017 | Barber et al. |
| 9,616,749 B2 | 4/2017 | Chamberlin |
| 9,618,993 B2 | 4/2017 | Murawski et al. |
| 9,715,614 B2 | 7/2017 | Todeschini et al. |
| 9,734,493 B2 | 8/2017 | Gomez et al. |
| 10,019,334 B2 | 7/2018 | Caballero et al. |
| 10,021,043 B2 | 7/2018 | Sevier |
| 10,133,797 B1* | 11/2018 | Mishra ................ G06F 16/254 |
| 10,327,158 B2 | 6/2019 | Wang et al. |
| 10,410,029 B2 | 9/2019 | Powilleit |
| 2003/0204431 A1* | 10/2003 | Ingman ............ G06Q 10/06311 |
| | | 705/7.16 |
| 2004/0181467 A1* | 9/2004 | Raiyani ............... G06Q 10/087 |
| | | 705/28 |
| 2004/0220847 A1* | 11/2004 | Ogushi ................. G06Q 10/06 |
| | | 700/100 |
| 2005/0093881 A1* | 5/2005 | Okita .................... G06Q 10/06 |
| | | 345/589 |
| 2005/0209902 A1* | 9/2005 | Iwasaki .......... G06Q 10/063114 |
| | | 705/7.26 |
| 2006/0224432 A1* | 10/2006 | Li ......................... G06Q 10/06 |
| | | 705/7.21 |
| 2007/0063048 A1 | 3/2007 | Havens et al. |
| 2007/0080930 A1* | 4/2007 | Logan .................... G06Q 10/06 |
| | | 345/156 |

(56) References Cited

U.S. PATENT DOCUMENTS

| | | | |
|---|---|---|---|
| 2007/0156878 A1* | 7/2007 | Martin | G06Q 10/10 709/223 |
| 2008/0164998 A1* | 7/2008 | Scherpbier | G16H 40/20 340/539.13 |
| 2009/0099898 A1* | 4/2009 | Ehrman | G06Q 10/06 705/7.15 |
| 2009/0134221 A1 | 5/2009 | Zhu et al. | |
| 2010/0142542 A1 | 6/2010 | Wie et al. | |
| 2010/0177076 A1 | 7/2010 | Essinger et al. | |
| 2010/0177080 A1 | 7/2010 | Essinger et al. | |
| 2010/0177707 A1 | 7/2010 | Essinger et al. | |
| 2010/0177749 A1 | 7/2010 | Essinger et al. | |
| 2010/0178756 A1 | 7/2010 | Higgins et al. | |
| 2010/0179756 A1* | 7/2010 | Higgins | G01C 21/20 701/414 |
| 2010/0265880 A1 | 10/2010 | Rautiola et al. | |
| 2011/0093538 A1* | 4/2011 | Weir | G06Q 10/06 709/205 |
| 2011/0169999 A1 | 7/2011 | Grunow et al. | |
| 2011/0173617 A1 | 7/2011 | Gargash et al. | |
| 2011/0202554 A1 | 8/2011 | Powilleit et al. | |
| 2012/0111946 A1 | 5/2012 | Golant | |
| 2012/0168512 A1 | 7/2012 | Kotlarsky et al. | |
| 2012/0193423 A1 | 8/2012 | Samek | |
| 2012/0203647 A1 | 8/2012 | Smith | |
| 2012/0223141 A1 | 9/2012 | Good et al. | |
| 2012/0310699 A1* | 12/2012 | McKenna | G06Q 10/00 705/7.26 |
| 2013/0043312 A1 | 2/2013 | Van Horn | |
| 2013/0075168 A1 | 3/2013 | Amundsen et al. | |
| 2013/0090963 A1* | 4/2013 | Sharma | G06Q 10/063112 705/7.13 |
| 2013/0150017 A1* | 6/2013 | Gold | H04W 8/245 455/419 |
| 2013/0175341 A1 | 7/2013 | Kearney et al. | |
| 2013/0175343 A1 | 7/2013 | Good | |
| 2013/0257744 A1 | 10/2013 | Daghigh et al. | |
| 2013/0257759 A1 | 10/2013 | Daghigh | |
| 2013/0270346 A1 | 10/2013 | Xian et al. | |
| 2013/0275164 A1* | 10/2013 | Gruber | G10L 17/22 705/5 |
| 2013/0287258 A1 | 10/2013 | Kearney | |
| 2013/0292475 A1 | 11/2013 | Kotlarsky et al. | |
| 2013/0292477 A1 | 11/2013 | Hennick et al. | |
| 2013/0293539 A1 | 11/2013 | Hunt et al. | |
| 2013/0293540 A1 | 11/2013 | Laffargue et al. | |
| 2013/0306728 A1 | 11/2013 | Thuries et al. | |
| 2013/0306731 A1 | 11/2013 | Pedraro | |
| 2013/0307964 A1 | 11/2013 | Bremer et al. | |
| 2013/0308625 A1 | 11/2013 | Corcoran | |
| 2013/0313324 A1 | 11/2013 | Koziol et al. | |
| 2013/0313325 A1 | 11/2013 | Wilz et al. | |
| 2013/0342717 A1 | 12/2013 | Havens et al. | |
| 2014/0001267 A1 | 1/2014 | Giordano et al. | |
| 2014/0002828 A1 | 1/2014 | Laffargue et al. | |
| 2014/0008439 A1 | 1/2014 | Wang | |
| 2014/0025584 A1 | 1/2014 | Liu et al. | |
| 2014/0034734 A1 | 2/2014 | Sauerwein | |
| 2014/0036848 A1 | 2/2014 | Pease et al. | |
| 2014/0039693 A1 | 2/2014 | Havens et al. | |
| 2014/0040905 A1* | 2/2014 | Tsunoda | G06Q 10/06311 718/103 |
| 2014/0042814 A1 | 2/2014 | Kather et al. | |
| 2014/0049120 A1 | 2/2014 | Kohtz et al. | |
| 2014/0049635 A1 | 2/2014 | Laffargue et al. | |
| 2014/0061306 A1 | 3/2014 | Wu et al. | |
| 2014/0063289 A1 | 3/2014 | Hussey et al. | |
| 2014/0066136 A1 | 3/2014 | Sauerwein et al. | |
| 2014/0067692 A1 | 3/2014 | Ye et al. | |
| 2014/0070005 A1 | 3/2014 | Nahill et al. | |
| 2014/0071840 A1 | 3/2014 | Venancio | |
| 2014/0074746 A1 | 3/2014 | Wang | |
| 2014/0076974 A1 | 3/2014 | Havens et al. | |
| 2014/0078341 A1 | 3/2014 | Havens et al. | |
| 2014/0078342 A1 | 3/2014 | Li et al. | |
| 2014/0078345 A1 | 3/2014 | Showering | |
| 2014/0098792 A1 | 4/2014 | Wang et al. | |
| 2014/0100774 A1 | 4/2014 | Showering | |
| 2014/0100813 A1 | 4/2014 | Showering | |
| 2014/0103115 A1 | 4/2014 | Meier et al. | |
| 2014/0104413 A1 | 4/2014 | McCloskey et al. | |
| 2014/0104414 A1 | 4/2014 | McCloskey et al. | |
| 2014/0104416 A1 | 4/2014 | Li et al. | |
| 2014/0104451 A1 | 4/2014 | Todeschini et al. | |
| 2014/0106594 A1 | 4/2014 | Skvoretz | |
| 2014/0106725 A1 | 4/2014 | Sauerwein | |
| 2014/0108010 A1 | 4/2014 | Maltseff et al. | |
| 2014/0108402 A1 | 4/2014 | Gomez et al. | |
| 2014/0108682 A1 | 4/2014 | Caballero | |
| 2014/0110485 A1 | 4/2014 | Toa et al. | |
| 2014/0114530 A1 | 4/2014 | Fitch et al. | |
| 2014/0121438 A1 | 5/2014 | Kearney | |
| 2014/0121445 A1 | 5/2014 | Ding et al. | |
| 2014/0124577 A1 | 5/2014 | Wang et al. | |
| 2014/0124579 A1 | 5/2014 | Ding | |
| 2014/0125842 A1 | 5/2014 | Winegar | |
| 2014/0125853 A1 | 5/2014 | Wang | |
| 2014/0125999 A1 | 5/2014 | Longacre et al. | |
| 2014/0129378 A1 | 5/2014 | Richardson | |
| 2014/0131438 A1 | 5/2014 | Kearney | |
| 2014/0131441 A1 | 5/2014 | Nahill et al. | |
| 2014/0131443 A1 | 5/2014 | Smith | |
| 2014/0131444 A1 | 5/2014 | Wang | |
| 2014/0131445 A1 | 5/2014 | Ding et al. | |
| 2014/0131448 A1 | 5/2014 | Xian et al. | |
| 2014/0133379 A1 | 5/2014 | Wang et al. | |
| 2014/0136208 A1 | 5/2014 | Maltseff et al. | |
| 2014/0136255 A1* | 5/2014 | Grabovski | G06Q 10/063112 705/7.14 |
| 2014/0140585 A1 | 5/2014 | Wang | |
| 2014/0146961 A1* | 5/2014 | Ristock | H04M 3/5234 379/265.12 |
| 2014/0151453 A1 | 6/2014 | Meier et al. | |
| 2014/0152882 A1 | 6/2014 | Samek et al. | |
| 2014/0158770 A1 | 6/2014 | Sevier et al. | |
| 2014/0159869 A1 | 6/2014 | Zumsteg et al. | |
| 2014/0166755 A1 | 6/2014 | Liu et al. | |
| 2014/0166757 A1 | 6/2014 | Smith | |
| 2014/0166759 A1 | 6/2014 | Liu et al. | |
| 2014/0168787 A1 | 6/2014 | Wang et al. | |
| 2014/0175165 A1 | 6/2014 | Havens et al. | |
| 2014/0175172 A1 | 6/2014 | Jovanovski et al. | |
| 2014/0180461 A1* | 6/2014 | Heck | G06Q 10/06311 700/97 |
| 2014/0191644 A1 | 7/2014 | Chaney | |
| 2014/0191913 A1 | 7/2014 | Ge et al. | |
| 2014/0197238 A1 | 7/2014 | Lui et al. | |
| 2014/0197239 A1 | 7/2014 | Havens et al. | |
| 2014/0197304 A1 | 7/2014 | Feng et al. | |
| 2014/0203087 A1 | 7/2014 | Smith et al. | |
| 2014/0204268 A1 | 7/2014 | Grunow et al. | |
| 2014/0214631 A1 | 7/2014 | Hansen | |
| 2014/0217166 A1 | 8/2014 | Berthiaume et al. | |
| 2014/0217180 A1 | 8/2014 | Liu | |
| 2014/0222522 A1* | 8/2014 | Chait | G06Q 10/0637 705/7.36 |
| 2014/0231500 A1 | 8/2014 | Ehrhart et al. | |
| 2014/0232930 A1 | 8/2014 | Anderson | |
| 2014/0247315 A1 | 9/2014 | Marty et al. | |
| 2014/0263493 A1 | 9/2014 | Amurgis et al. | |
| 2014/0263645 A1 | 9/2014 | Smith et al. | |
| 2014/0267609 A1 | 9/2014 | Laffargue | |
| 2014/0270196 A1 | 9/2014 | Braho et al. | |
| 2014/0270229 A1 | 9/2014 | Braho | |
| 2014/0278387 A1 | 9/2014 | DiGregorio | |
| 2014/0278391 A1 | 9/2014 | Braho et al. | |
| 2014/0278808 A1* | 9/2014 | Iyoob | G06Q 30/0206 705/7.35 |
| 2014/0282015 A1* | 9/2014 | Nixon | G05B 11/01 715/733 |
| 2014/0282210 A1 | 9/2014 | Bianconi | |
| 2014/0282257 A1* | 9/2014 | Nixon | G05B 11/01 715/835 |

(56) References Cited

U.S. PATENT DOCUMENTS

| | | |
|---|---|---|
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0066529 A1* | 3/2015 | Lattuca .................. G06Q 50/22 705/2 |
| 2015/0069130 A1 | 3/2015 | Gannon |
| 2015/0071818 A1 | 3/2015 | Todeschini |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0106145 A1* | 4/2015 | Hamilton ....... G06Q 10/063114 705/7.15 |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chang et al. |
| 2015/0169929 A1 | 6/2015 | Williams et al. |
| 2015/0178523 A1 | 6/2015 | Gelay et al. |
| 2015/0178534 A1 | 6/2015 | Jovanovski et al. |
| 2015/0178535 A1 | 6/2015 | Bremer et al. |
| 2015/0178536 A1 | 6/2015 | Hennick et al. |
| 2015/0178537 A1 | 6/2015 | El et al. |
| 2015/0178671 A1* | 6/2015 | Jones .................. G06Q 10/087 705/28 |
| 2015/0181093 A1 | 6/2015 | Zhu et al. |
| 2015/0181109 A1 | 6/2015 | Gillet et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199641 A1* | 7/2015 | Napoli .......... G06Q 10/063114 705/7.15 |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0188298 A1* | 6/2016 | Vandikas .............. G06Q 10/063 717/105 |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0292624 A1* | 10/2016 | Curtland .............. G06Q 10/087 |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 14/715,916 for Evaluating Image Values filed May 19, 2015 (Ackley); 60 pages.

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al.); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 for Hands-Free Human Machine Interface Responsive To a Driver of a Vehicle filed May 6, 2015 (Fitch et al.); 44 pages.

(56) References Cited

OTHER PUBLICATIONS

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

U.S. Patent Application for Indicia Reader filed Apr. 1, 2015 (Huck), U.S. Appl. No. 14/676,109.

\* cited by examiner

INTERLEAVING SURPRISE ACTIVITIES IN WORKFLOW

CROSS-REFERENCE TO RELATED APPLICATION

The present application claims the benefit of U.S. Patent Application No. 62/097,367 for Interleaving Surprise Activities in Workflow filed Dec. 29, 2014, which is hereby incorporated by reference in its entirety.

FIELD OF THE INVENTION

The invention is generally related to a method of prioritizing retail product restocking, and, more specifically, to a method of interleaving surprise activities into worker workflow activities.

BACKGROUND

In retail location workflows, and other workflows, there are a large number of different workflow activities that need to be performed by any given worker. Many of these activities come up after a worker is given their primary work duties for a given period of time. Voice directed workflow applications provide a way to guide workers through their primary workflow activities. Conventionally, workers often have multiple voice directed workflow applications on handheld devices that each facilitate a single workflow. If there is a different second workflow the worker needs to interleave with their primary workflow, the worker often must leave the current application, log into another application, complete the work, and the re-log back into the original application to continue the primary workflow. In other instances, when more than one workflow is incorporated into a single application, the user still needs to navigate through a series of nested menus of functionality for the primary workflow to enter another nested menu of functionality to access the second workflow. Both of these conventional approaches result in workflows taking longer to complete, and can sometime require the worker to revisit locations multiple times, rather than accomplishing the objectives of both workflows in the most efficient manner.

SUMMARY

In an aspect of the invention, a method comprises: obtaining primary workflow having a list of activities being performed by a worker; obtaining a surprise activity; comparing a context of the worker to contextual needs of the surprise activity; and interleaving the surprise activity in the list of activities based on a best fit context of the worker.

In an embodiment, obtaining a list of activities being performed by a worker includes obtaining multiple lists of activities for multiple workers, and wherein the interleaving of the surprise activity is based on a best fit context of the multiple workers.

In an embodiment, the context of the worker and contextual needs of the surprise activity include a prioritization.

In another embodiment, the context and contextual needs include a current location of the worker and a location of the surprise activity.

In yet another embodiment, the worker currently closest to the location of the surprise activity is the worker selected for performing the surprise activity.

In yet another embodiment, the worker currently closest to the location of the surprise activity is the worker selected for performing the surprise activity if the worker context is indicative of the worker being qualified and having a required tool to perform the surprise activity.

In another embodiment,=the context and contextual needs include a training level of the worker.

In another embodiment, the context and contextual needs include equipment needed to accomplish the surprise activity.

In an embodiment, the method comprises determining if deadlines for activities in the list of activities being performed by a worker will be missed if the surprise activity is interleaved in the worker's list of activities.

In another embodiment, the method comprises blocking the interleaving of the surprise activity in the worker's list of activities if a deadline will be missed.

In an embodiment, the context of the worker includes the context at multiple remaining activities in the worker's list of activities, and wherein the surprise task is interleaved after a future activity in the list of activities having the best fit context.

In an embodiment, the method comprises speaking a voice command into a headset to directly access a secondary workflow having the surprise activity.

In an embodiment, the method comprises speaking a voice command into the headset to directly return to the primary workflow from the secondary workflow.

In another aspect of the invention, a device comprises: a processor; a headset having speakers and a microphone coupled to the processor; and a memory device coupled to the processor and having a program stored thereon for execution by the processor to: obtain a primary workflow having a list of activities being performed by a worker; obtain a surprise activity; compare a context of the worker to contextual needs of the surprise activity; and interleave the surprise activity in the list of activities based on a best fit context of the worker.

In an embodiment, obtaining a list of activities being performed by a worker includes obtaining multiple lists of activities for multiple workers, and wherein the interleaving of the surprise activity is based on a best fit context of the multiple workers.

In another embodiment, the context and contextual needs include a current location of each worker and a location of the surprise activity, wherein the worker currently closest to the location of the surprise activity is the worker selected for performing the surprise activity if the worker context is indicative of the worker being qualified and having a required tool to perform the surprise activity.

In another embodiment, the processor executes the program to determine if deadlines for activities in the list of activities being performed by a worker will be missed if the surprise activity is interleaved in the worker's list of activities.

In yet another embodiment, the processor executes the program to block the interleaving of the surprise activity in the worker's list of activities if a deadline will be missed.

In an embodiment, the processor executes the program to receive a voice command from the headset to directly access a secondary workflow having the surprise activity.

In another embodiment, the processor executes the program to receive a voice command from the headset to directly return to the primary workflow.

BRIEF DESCRIPTION OF THE DRAWINGS

The invention will now be described by way of example, with reference to the accompanying Figures, of which.

DETAILED DESCRIPTION

Figure 1:
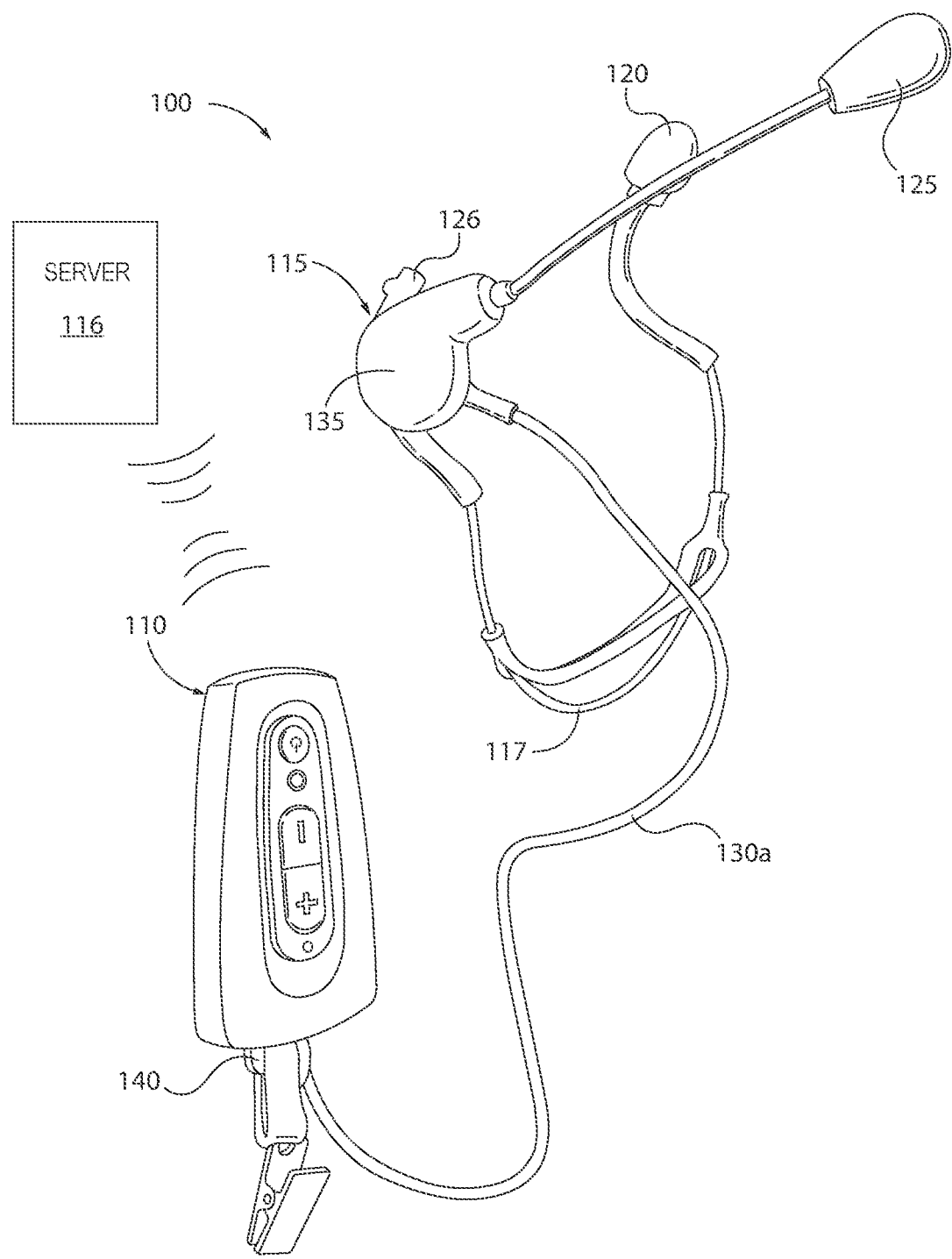
FIG. 1 is a perspective view of a distributed headset.

In the following description, reference is made to the accompanying drawings that form a part hereof, and in which is shown by way of illustration specific embodiments which can be practiced. These embodiments are described in sufficient detail to enable those skilled in the art to practice the invention, and it is to be understood that other embodiments can be utilized and that structural, logical, and electrical changes can be made without departing from the scope of the present invention. The following description of example embodiments is, therefore, not to be taken in a limited sense, and the scope of the present invention is defined by the appended claims.

The functions or algorithms described herein can be implemented in software or a combination of software and human implemented procedures in one embodiment. The software can consist of computer executable instructions stored on computer readable media or computer readable storage device such as one or more memory or other type of hardware based storage devices, either local or networked. Further, such functions correspond to modules, which are software, hardware, firmware, or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

In retail location workflows, and other workflows, there are a large number of different workflow activities that need to be performed by any given worker. Many of these activities come up after a worker is given their primary work duties for a given period of time. Voice directed workflow applications provide a way to guide workers through their primary workflow activities, but that does not solve the problem of identifying the proper worker to perform an "interrupt driven" activity at an arbitrary point in time.

In a voice directed workflow, a worker will be told the correct location to go to, verify their location, and then they will be told the specific actions they need to perform. Typically, this is a series of similar activities, like re-stocking shelves, or selecting items from specific locations to build an order. Instead of following individual types of workflow activities, arbitrary additional workflow activities can be introduced into the voice directed workflow at any time based on when the worker is in the appropriate context to perform that activity.

A workflow application framework allows workers to be directed through their activities from a data driven implementation. Given knowledge of the workflow activities being performed by every worker in a given facility, additional work activities can be assigned to the best fit worker, interleaving the new activity into their stream of work.

Additional contextual information about the worker, the work they are performing, and the equipment that they have with them to perform the work they are currently performing can be used to identify the best fit worker for an additional or "surprise" work activity. For additional, work activities, contextual needs can be identified. These needs might include location or proximity, worker certification or training for specific tasks involved in performing the surprise work activity, or the equipment needed to perform the task or tasks. The location can also involve a sense of a path being taken by the worker. For instance, if a worker is completing a work activity at a first location, and surprise work activity is on a likely path to the location of the next work activity task, or a later work activity task, the surprise work activity can be added to the activity list of the worker following the next or later activity task, provided the worker has the experience, equipment, and time to perform the surprise work activity and is also the best identified worker.

The best worker is identified for a given task by scoring each possible worker based on the needs and contextual information. Once the best worker is identified, this new workflow activity can be transmitted to the worker already performing their work, and interleaved into their activities.

Priority of work activities can also be taken into account, as well as deadlines for completing both existing work activities for workers and the surprise work activity. In one example in a retail store environment, a worker can be stocking shelves, and is two steps away from a shelf that needs a label change, such as to reflect a new price for items on the shelf. If the worker is trained in label changes, has an appropriate printer to print a new label, and if performing this surprise work activity will not adversely affect the stocking of product, then the worker can be the best worker for the activity and the activity will be interleaved into their stocking activities. A further example activity can be taking an inventory of a specific product at a shelf.

For example, if the worker is stocking turkeys just before a holiday, the stocking activity can be a higher priority work activity, and the worker may not be the best fit even if the location context alone is a best fit. Thus, a high priority activity can preempt a lower priority activity from being interleaved in a given workers list of activities. Priorities are optional, and can be specified by store management. In one form of prioritization, activities can be designated as interruptible or non-interruptible, or surprise activities can be designated as interrupt all tasks, or only interrupt interruptible tasks. One such surprise activity can be safety related, such as spill that needs immediate cleaning. There are many different prioritization schemes that can be used. Each type of work activity can be provided a priority level from multiple priority levels. In a further prioritization scheme, each different context can be assigned priorities. Prioritization schemes can be modified to match business plans for each business. For instance, location can be giving the highest priority. For another business, customer safety can be given the highest priority. Price changes can be a higher priority for other business competing primarily on price.

In an embodiment shown in FIG. 1, a distributed headset 100 is a wireless enabled voice recognition device that utilizes a hands-free profile, where increased battery life is obtained by off-loading elements of the traditional headset into an external electronics module 110 ("module"). The module 110 can communicate with a server 116 to receive a batch of activities, referred to as a workflow or work queue. Server 116 can have one or more user or operator computers attached to direct workflow, one of which can also receive wireless signals from the module 125 to interface between the headset 110 and server 116. In an embodiment, the server 116 can provide the distributed headset 100 with a single activity at a time.

The external module 110 is coupled to a light-weight and comfortable headset 115 secured to a worker head via a headband 117. The headband 117 can be a band that is designed to be secured on a worker's head, in an ear, over an ear, or the like. In an embodiment, the headset 115 includes one or more speakers 120 and one or more microphones 125, 126. In an embodiment, microphone 125 is a conventional microphone that converts sound waves into analog signals. Microphone 126 can be one or more microphones that provide for noise cancellation continuously receiving and blocking environmental sounds to enhance voice recognition and optionally provide for noise cancellation.

The external electronics module 110 houses several components typically incorporated in a conventional headset. Thus, the distributed headset 100 reduces the weight of the headset 115 by incorporating heavier components, such as the battery, into the external module 110. In the embodiment shown in FIG. 1, the external module 110 houses one or more of a rechargeable or long life battery, keypad, Bluetooth® antenna, and printed circuit board assembly (PCBA) electronics. The module 110 can include a lapel clip or a lanyard to facilitate attachment of the module 110 to the worker's torso.

Figure 2:
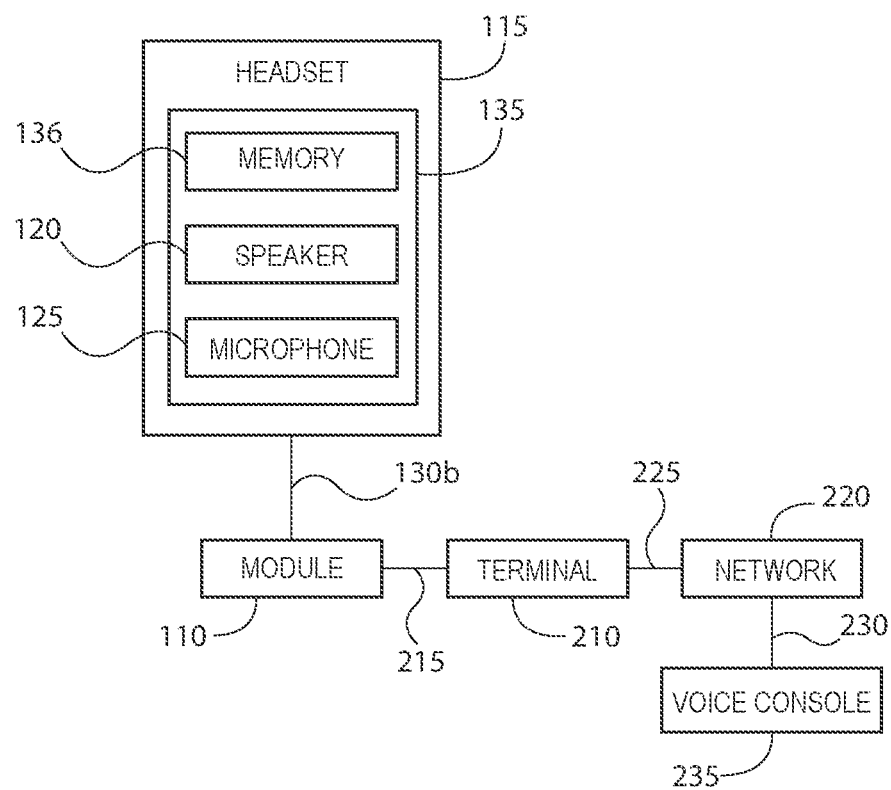
FIG. 2 is a schematic diagram of a distributed headset system.

In the embodiments shown in FIGS. 1 and 2, the headset 115 is communicatively connected to the electronics module 110 via a communication link 130, such as a small audio cable 130a shown in FIG. 1, or wireless link 130b shown in FIG. 2. The distributed headset 100 provides a flexible use case across multiple workflows in multiple markets, such as grocery retail, direct store delivery, healthcare, etc. In some embodiments, the distributed headset 100 has a low profile and is not intimidating to a customer in a retail setting. Thus, in some embodiments, the headset 115 can be minimalistic in appearance in an embodiment.

In an embodiment, the cable 130a electrically connects the battery in the module 110 to the headset 115 and provides a source of power to the headset 115.

In an embodiment, module 110 can be used with different headsets, such as Honeywell Vocollect™ headsets, depending on environment.

In an embodiment, the headset electronic circuitry package 135 includes a memory 136 that stores the unique identifier of the headset 115. The headset electronic circuitry package 135 electronically couples the memory 136, speakers 120, and microphones 125 to the electronics module 110. In an embodiment, the audio cable 130 includes multiple conductors or communication lines for signals which can include a speaker +, speaker −, ground digital, microphone, secondary microphone, microphone ground, among others. The module 110 optionally utilizes a user configurable attachment 140, such as a plastic loop, and attachment position on the worker. In embodiments comprising a wireless link between the headset 115 and module 110, such as Bluetooth™ type of communication link, the headset 115 includes a small, lightweight battery, where the communication link 130 provides wireless signals suitable for exchanging voice communications.

In the embodiment shown in FIG. 2, an architecture 200 of distributed headset system 100 provides communications to a worker. The architecture 200 includes the headset 115 and external electronics module 110. Module 110 can be coupled to the server 116 or other device, such as a terminal 210 via a wireless link 215, such as a Bluetooth® connection. The terminal 210 can be further coupled to a network 220 via a wireless or wired connection 225, such as WLAN, or other common wireless protocols, and further coupled via a wired or wireless connection 230 to a voice console 235. The voice console 235 assigns an operator to the terminal 210. Voice templates can be stored in terminal 210 to recognize worker voice interactions and convert the interaction into text based data and commands. The data and commands can interact with an application running on the terminal 210.

Those of ordinary skill in the art would appreciate the functions ascribed to individual elements of the architecture 200 can be performed in one or more locations. For example, in an embodiment, the terminal 210 can perform voice recognition, or in another embodiment, the module 110 can perform voice recognition utilizing the voice templates. In an embodiment, first stages of voice recognition can be performed by the module 110, with later stages being performed on the terminal 210. In an embodiment, raw audio is transmitted from the module 110 to terminal 210 where the later stages of recognition can be performed.

Figure 3:
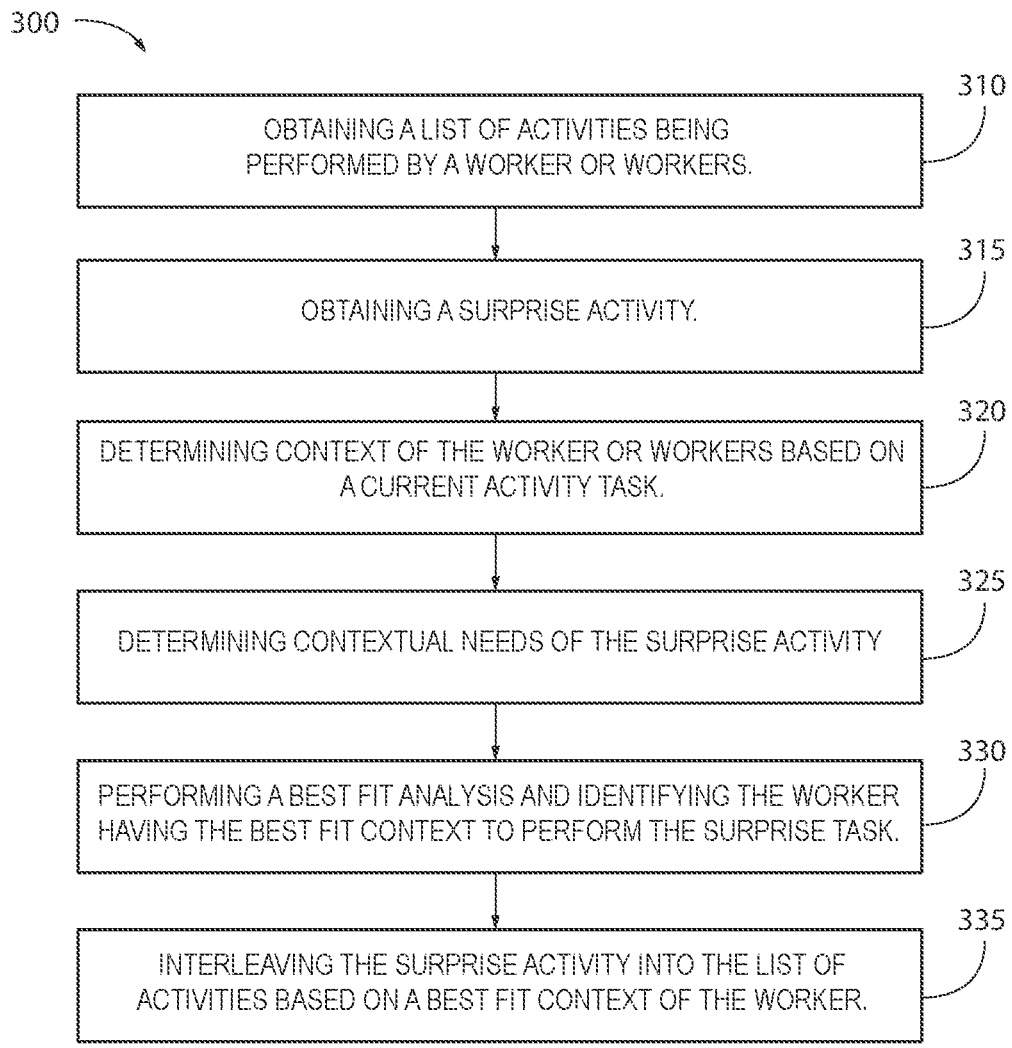
FIG. 3 is a block diagram of interleaving activities based on worker context.

In an embodiment shown in FIG. 3, server 116 performs a method 300 of obtaining a list of activities being performed by a worker at 210. At 315, a surprise activity can be obtained. The surprise activity can be generated by manager or operator, or other user, or can also be based on process control system determination from sensors, such as in an industrial plant setting. Sensors in a retail or distribution center can be of a type that detect spills or other events that needs attention, and automatically generate an activity to address the event. At 320, a context of the worker or workers can be determined based on a current activity task. The context can also include a current location of the worker, training of the worker, and equipment carried by the worker. At 325, contextual needs of the surprise activity can be determined. Such contextual needs can include a current location of the surprise activity and training level and equipment needed by a worker to perform the surprise activity. A context of the worker or workers based on a current activity task, or activity task to be performed is compared at 320 to contextual needs of the surprise activity. At 330, a best fit analysis can be performed to identify the worker having the best fit context to perform the surprise task. At 335, the surprise activity is interleaved into the list of activities based on a best fit context of the worker.

In various embodiments, obtaining a list of activities 310 being performed by a worker includes obtaining multiple lists of activities for multiple workers. Interleaving of the surprise activity at 325 can be based on a best fit context of the multiple workers, or on a next or future activity of the workers. In some embodiments, the context of the worker and contextual needs of the surprise activity include a prioritization of the activities.

The context and contextual needs can also include a current location of the worker and a location of the surprise activity. In an embodiment, the worker currently closest to the location of the surprise activity is the worker selected for performing the surprise activity. In another embodiment, the worker currently closest to the location of the surprise activity is the worker selected for performing the surprise activity if the worker context is indicative of the worker being qualified and having a required tool to perform the surprise activity.

The context and contextual needs can also include a training level of the worker and can further include equipment needed to accomplish the surprise activity, such as a label printer or cleaning supplies. The context of the worker can also include the context at multiple remaining activities in the worker's list of activities, and wherein the surprise activity is interleaved after a future activity in the list of activities having the best fit context.

Figure 4:
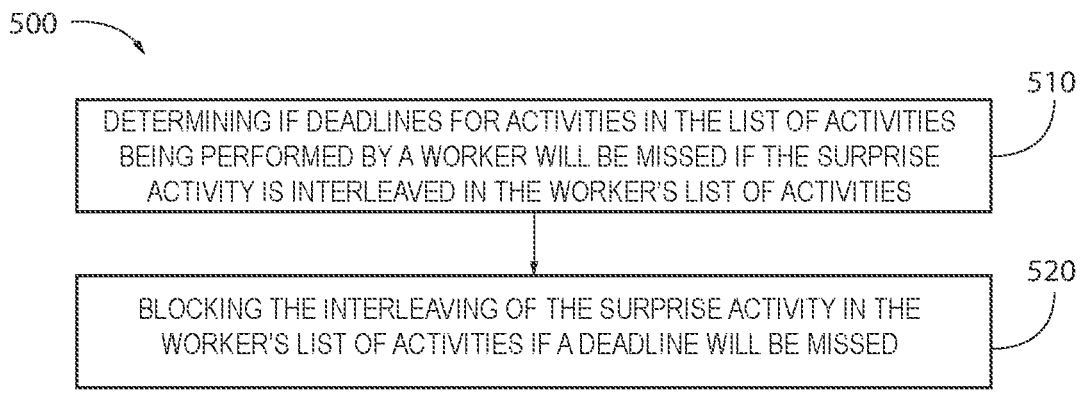
FIG. 4 is a block diagram of directly accessing a secondary workflow from a primary workflow.

In an embodiment shown in FIG. 4, a method 600 of integrating a secondary workflow with the surprise activity into the primary workflow by voice command. A surprise activity is obtained by the worker at 610. The worker speaks a voice command into the microphone 125 of the headset 115 to directly go to the secondary workflow with the surprise activity at block 615. The worker has completes the secondary workflow at 620. At 625, the worker speaks a voice command into the microphone 125 of the headset 115 to directly return to the primary workflow. The headset 115 returns to the primary workflow without the worker having to manually exit and enter various applications and nested workflow menus at 630.

Thus, in the embodiment described in FIG. 4, multiple workflows are built into a single mobile application stored on the terminal 210 or server 116, the application providing single voice commands to immediately jump from primary to secondary workflows, and returning to the same point in the primary workflow when the secondary workflow has been completed. In an embodiment, the mobile application is stored on terminal 210 or server 116 described in FIGS. 1 and 2. In an embodiment, the method 600 permits a worker to use one, voice assisted or vice driven, mobile application to carry out and interleave all necessary workflows, and any changes in communication with the terminal 210 would be transparent to the worker.

Figure 5:
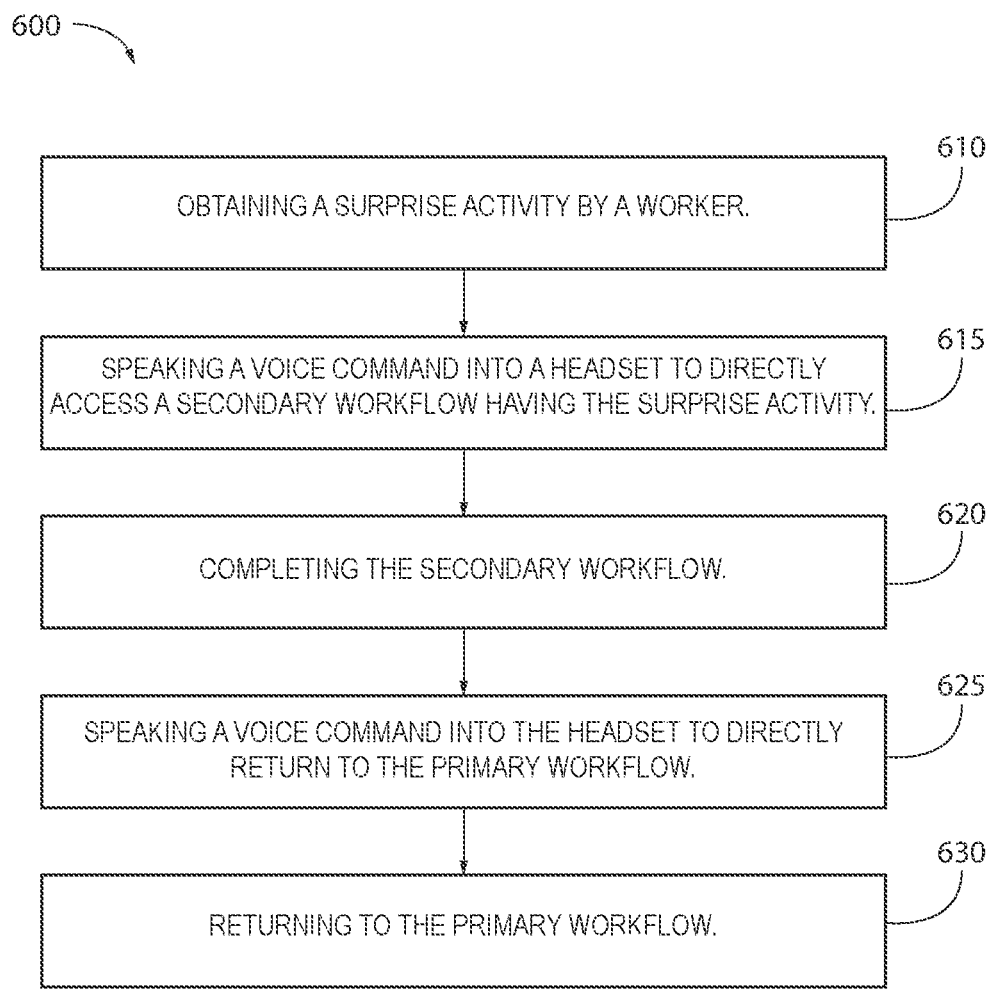
FIG. 5 is a block diagram of interleaving as a function of activity deadlines.

In an embodiment shown in FIG. 5, a method 500 includes determining at 510 if deadlines for activities in the list of activities being performed by a worker will be missed if the surprise activity is interleaved in the worker's list of activities, and at 520 blocking the interleaving of the surprise activity in the worker's list of activities if a deadline will be missed.

Figure 6:
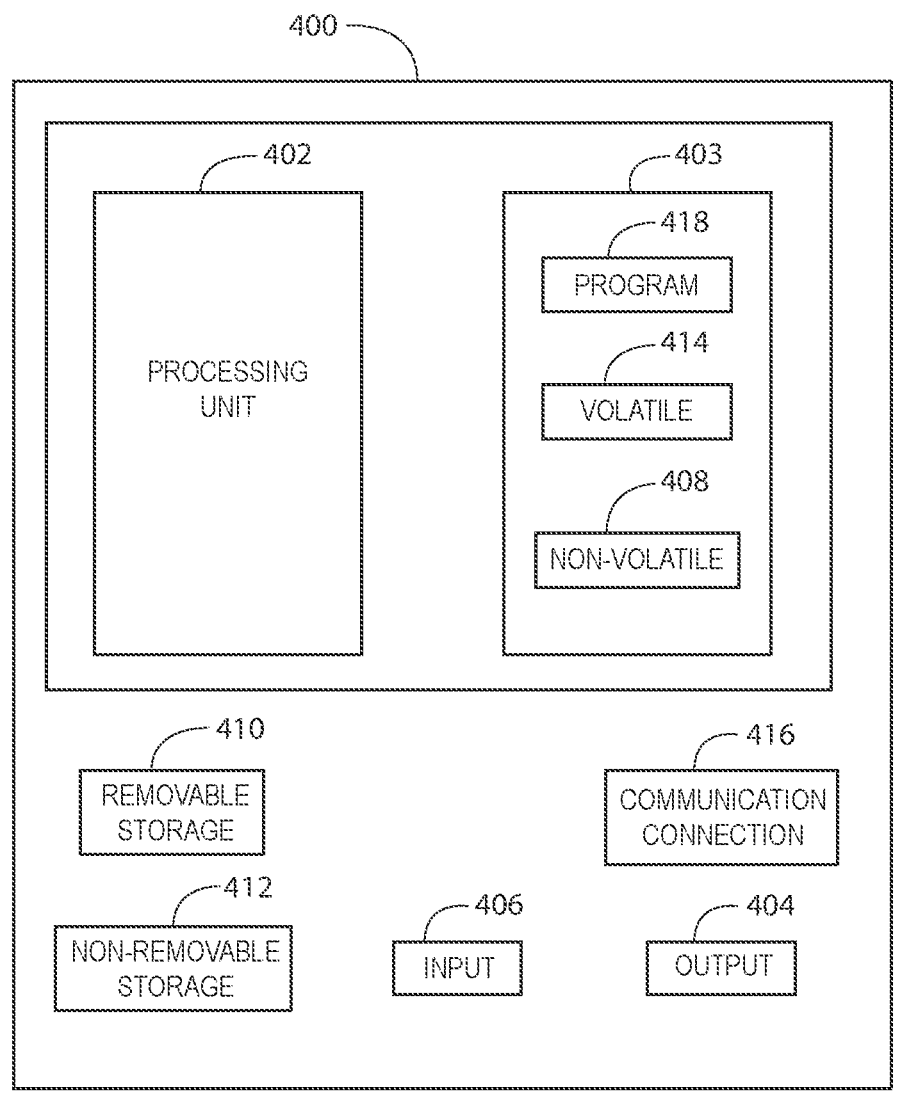
FIG. 6 is a schematic diagram of a computer system for interleaving activities in a workflow.

FIG. 6 is a block schematic diagram of a computer system 400 to implement methods according to example embodiments. All components need not be used in various embodiments. One example computing device in the form of a computer 400 can include a processing unit 402, memory 403, removable storage 410, and non-removable storage 412. Although the example computing device is illustrated and described as computer 400, the computing device can be in different forms in different embodiments. For example, the computing device can instead be a smartphone, a tablet, headset, smartwatch, or other computing device including the same or similar elements as illustrated and described with regard to FIG. 4. Devices such as smartphones, tablets, headsets, and smartwatches are generally collectively referred to as mobile devices. Further, although the various data storage elements are illustrated as part of the computer 400, the storage can also or alternatively include cloud-based storage accessible via a network, such as the Internet.

Memory 403 can include volatile memory 414 and non-volatile memory 408. Computer 400 can include—or have access to a computing environment that includes—a variety of computer-readable media, such as volatile memory 414 and non-volatile memory 408, removable storage 410 and non-removable storage 412. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 400 can include or have access to a computing environment that includes input 406, output 404, and a communication connection 416. Output 404 can include a display device, such as a touchscreen, that also can serve as an input device. The input 406 can include one or more of a touchscreen, touchpad, mouse, keyboard, camera, one or more device-specific buttons, one or more sensors integrated within or coupled via wired or wireless data connections to the computer 400, and other input devices. The computer can operate in a networked environment using a communication connection to connect to one or more remote computers, such as database servers. The remote computer can include a personal computer (PC), server, router, network PC, a peer device or other common network node, or the like. The communication connection can include a Local Area Network (LAN), a Wide Area Network (WAN), cellular, WiFi, Bluetooth, or other networks.

Computer-readable instructions stored on a computer-readable medium are executable by the processing unit 402 of the computer 400. A hard drive, CD-ROM, and RAM are some examples of articles including a non-transitory computer-readable medium such as a storage device. The terms computer-readable medium and storage device do not include carrier waves. For example, a computer program 418 capable of providing a generic technique to perform access control check for data access and/or for doing an operation on one of the servers in a component object model (COM) based system can be included on a CD-ROM and loaded from the CD-ROM to a hard drive. The computer-readable instructions allow computer 400 to provide generic access controls in a COM based computer network system having multiple users and servers.

Although a few embodiments have been described in detail above, other modifications are possible. For example, the logic flows depicted in the figures do not require the particular order shown, or sequential order, to achieve desirable results. Other steps can be provided, or steps can be eliminated, from the described flows, and other components can be added to, or removed from, the described systems. Other embodiments can be within the scope of the following claims.

To supplement the present disclosure, this application incorporates entirely by reference the following patents, patent application publications, and patent applications:
U.S. Pat. Nos. 6,832,725; 7,128,266;
U.S. Pat. Nos. 7,159,783; 7,413,127;
U.S. Pat. Nos. 7,726,575; 8,294,969;
U.S. Pat. Nos. 8,317,105; 8,322,622;
U.S. Pat. Nos. 8,366,005; 8,371,507;
U.S. Pat. Nos. 8,376,233; 8,381,979;
U.S. Pat. Nos. 8,390,909; 8,408,464;
U.S. Pat. Nos. 8,408,468; 8,408,469;
U.S. Pat. Nos. 8,424,768; 8,448,863;
U.S. Pat. Nos. 8,457,013; 8,459,557;
U.S. Pat. Nos. 8,469,272; 8,474,712;
U.S. Pat. Nos. 8,479,992; 8,490,877;
U.S. Pat. Nos. 8,517,271; 8,523,076;
U.S. Pat. Nos. 8,528,818; 8,544,737;
U.S. Pat. Nos. 8,548,242; 8,548,420;
U.S. Pat. Nos. 8,550,335; 8,550,354;
U.S. Pat. Nos. 8,550,357; 8,556,174;
U.S. Pat. Nos. 8,556,176; 8,556,177;
U.S. Pat. Nos. 8,559,767; 8,599,957;
U.S. Pat. Nos. 8,561,895; 8,561,903;

U.S. Pat. Nos. 8,561,905; 8,565,107;
U.S. Pat. Nos. 8,571,307; 8,579,200;
U.S. Pat. Nos. 8,583,924; 8,584,945;
U.S. Pat. Nos. 8,587,595; 8,587,697;
U.S. Pat. Nos. 8,588,869; 8,590,789;
U.S. Pat. Nos. 8,596,539; 8,596,542;
U.S. Pat. Nos. 8,596,543; 8,599,271;
U.S. Pat. Nos. 8,599,957; 8,600,158;
U.S. Pat. Nos. 8,600,167; 8,602,309;
U.S. Pat. Nos. 8,608,053; 8,608,071;
U.S. Pat. Nos. 8,611,309; 8,615,487;
U.S. Pat. Nos. 8,616,454; 8,621,123;
U.S. Pat. Nos. 8,622,303; 8,628,013;
U.S. Pat. Nos. 8,628,015; 8,628,016;
U.S. Pat. Nos. 8,629,926; 8,630,491;
U.S. Pat. Nos. 8,635,309; 8,636,200;
U.S. Pat. Nos. 8,636,212; 8,636,215;
U.S. Pat. Nos. 8,636,224; 8,638,806;
U.S. Pat. Nos. 8,640,958; 8,640,960;
U.S. Pat. Nos. 8,643,717; 8,646,692;
U.S. Pat. Nos. 8,646,694; 8,657,200;
U.S. Pat. Nos. 8,659,397; 8,668,149;
U.S. Pat. Nos. 8,678,285; 8,678,286;
U.S. Pat. Nos. 8,682,077; 8,687,282;
U.S. Pat. Nos. 8,692,927; 8,695,880;
U.S. Pat. Nos. 8,698,949; 8,717,494;
U.S. Pat. Nos. 8,717,494; 8,720,783;
U.S. Pat. Nos. 8,723,804; 8,723,904;
U.S. Pat. Nos. 8,727,223; D702,237;
U.S. Pat. Nos. 8,740,082; 8,740,085;
U.S. Pat. Nos. 8,746,563; 8,750,445;
U.S. Pat. Nos. 8,752,766; 8,756,059;
U.S. Pat. Nos. 8,757,495; 8,760,563;
U.S. Pat. Nos. 8,763,909; 8,777,108;
U.S. Pat. Nos. 8,777,109; 8,779,898;
U.S. Pat. Nos. 8,781,520; 8,783,573;
U.S. Pat. Nos. 8,789,757; 8,789,758;
U.S. Pat. Nos. 8,789,759; 8,794,520;
U.S. Pat. Nos. 8,794,522; 8,794,525;
U.S. Pat. Nos. 8,794,526; 8,798,367;
U.S. Pat. Nos. 8,807,431; 8,807,432;
U.S. Pat. Nos. 8,820,630; 8,822,848;
U.S. Pat. Nos. 8,824,692; 8,824,696;
U.S. Pat. Nos. 8,842,849; 8,844,822;
U.S. Pat. Nos. 8,844,823; 8,849,019;
U.S. Pat. Nos. 8,851,383; 8,854,633;
U.S. Pat. Nos. 8,866,963; 8,868,421;
U.S. Pat. Nos. 8,868,519; 8,868,802;
U.S. Pat. Nos. 8,868,803; 8,870,074;
U.S. Pat. Nos. 8,879,639; 8,880,426;
U.S. Pat. Nos. 8,881,983; 8,881,987;
U.S. Pat. Nos. 8,903,172; 8,908,995;
U.S. Pat. Nos. 8,910,870; 8,910,875;
U.S. Pat. Nos. 8,914,290; 8,914,788;
U.S. Pat. Nos. 8,915,439; 8,915,444;
U.S. Pat. Nos. 8,916,789; 8,918,250;
U.S. Pat. Nos. 8,918,564; 8,925,818;
U.S. Pat. Nos. 8,939,374; 8,942,480;
U.S. Pat. Nos. 8,944,313; 8,944,327;
U.S. Pat. Nos. 8,944,332; 8,950,678;
U.S. Pat. Nos. 8,967,468; 8,971,346;
U.S. Pat. Nos. 8,976,030; 8,976,368;
U.S. Pat. Nos. 8,978,981; 8,978,983;
U.S. Pat. Nos. 8,978,984; 8,985,456;
U.S. Pat. Nos. 8,985,457; 8,985,459;
U.S. Pat. Nos. 8,985,461; 8,988,578;
U.S. Pat. Nos. 8,988,590; 8,991,704;
U.S. Pat. Nos. 8,996,194; 8,996,384;
U.S. Pat. Nos. 9,002,641; 9,007,368;
U.S. Pat. Nos. 9,010,641; 9,015,513;
U.S. Pat. Nos. 9,016,576; 9,022,288;
U.S. Pat. Nos. 9,030,964; 9,033,240;
U.S. Pat. Nos. 9,033,242; 9,036,054;
U.S. Pat. Nos. 9,037,344; 9,038,911;
U.S. Pat. Nos. 9,038,915; 9,047,098;
U.S. Pat. Nos. 9,047,359; 9,047,420;
U.S. Pat. Nos. 9,047,525; 9,047,531;
U.S. Pat. Nos. 9,053,055; 9,053,378;
U.S. Pat. Nos. 9,053,380; 9,058,526;
U.S. Pat. Nos. 9,064,165; 9,064,167;
U.S. Pat. Nos. 9,064,168; 9,064,254;
U.S. Pat. Nos. 9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902;
U.S. Design Pat. No. D733,112;
U.S. Design Pat. No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;

U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;

U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed Can 14, 2014 (Jovanovski et al.);
U.S. patent application Ser. No. 14/283,282 for TERMINAL HAVING ILLUMINATION AND FOCUS CONTROL filed Can 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);
U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);
U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);
U.S. patent application Ser. No. 14/529,563 for ADAPTABLE INTERFACE FOR A MOBILE COMPUTING DEVICE filed Oct. 31, 2014 (Schoon et al.);
U.S. patent application Ser. No. 14/529,857 for BARCODE READER WITH SECURITY FEATURES filed Oct. 31, 2014 (Todeschini et al.);
U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);
U.S. patent application Ser. No. 14/531,154 for DIRECTING AN INSPECTOR THROUGH AN INSPECTION filed Nov. 3, 2014 (Miller et al.);
U.S. patent application Ser. No. 14/533,319 for BARCODE SCANNING SYSTEM USING WEARABLE DEVICE WITH EMBEDDED CAMERA filed Nov. 5, 2014 (Todeschini);
U.S. patent application Ser. No. 14/535,764 for CONCATENATED EXPECTED RESPONSES FOR SPEECH RECOGNITION filed Nov. 7, 2014 (Braho et al.);
U.S. patent application Ser. No. 14/568,305 for AUTO-CONTRAST VIEWFINDER FOR AN INDICIA READER filed Dec. 12, 2014 (Todeschini);
U.S. patent application Ser. No. 14/573,022 for DYNAMIC DIAGNOSTIC INDICATOR GENERATION filed Dec. 17, 2014 (Goldsmith);
U.S. patent application Ser. No. 14/578,627 for SAFETY SYSTEM AND METHOD filed Dec. 22, 2014 (Ackley et al.);
U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed Can 1, 2015 (Todeschini et al.);

U.S. patent application Ser. No. 14/702,979 for TRACKING BATTERY CONDITIONS filed Can 4, 2015 (Young et al.);

U.S. patent application Ser. No. 14/704,050 for INTERMEDIATE LINEAR POSITIONING filed Can 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed Can 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed Can 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed Can 8, 2015 (Chamberlin);

U.S. patent application Ser. No. 14/707,123 for APPLICATION INDEPENDENT DEX/UCS INTERFACE filed Can 8, 2015 (Pape);

U.S. patent application Ser. No. 14/707,492 for METHOD AND APPARATUS FOR READING OPTICAL INDICIA USING A PLURALITY OF DATA SOURCES filed Can 8, 2015 (Smith et al.);

U.S. patent application Ser. No. 14/710,666 for PRE-PAID USAGE SYSTEM FOR ENCODED INFORMATION READING TERMINALS filed Can 13, 2015 (Smith);

U.S. patent application Ser. No. 29/526,918 for CHARGING BASE filed Can 14, 2015 (Fitch et al.);

U.S. patent application Ser. No. 14/715,672 for AUGMENTED REALITY ENABLED HAZARD DISPLAY filed Can 19, 2015 (Venkatesha et al.);

U.S. patent application Ser. No. 14/715,916 for EVALUATING IMAGE VALUES filed Can 19, 2015 (Ackley);

U.S. patent application Ser. No. 14/722,608 for INTERACTIVE USER INTERFACE FOR CAPTURING A DOCUMENT IN AN IMAGE SIGNAL filed Can 27, 2015 (Showering et al.);

U.S. patent application Ser. No. 29/528,165 for IN-COUNTER BARCODE SCANNER filed Can 27, 2015 (Oberpriller et al.);

U.S. patent application Ser. No. 14/724,134 for ELECTRONIC DEVICE WITH WIRELESS PATH SELECTION CAPABILITY filed Can 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed Can 29, 2015 (Barten);

U.S. patent application Ser. No. 14/724,908 for IMAGING APPARATUS HAVING IMAGING ASSEMBLY filed Can 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed Can 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

What is claimed is:

1. A method for managing a workflow activity, the method comprising:

obtaining, by a server, multiple voice directed primary workflows, wherein each voice directed primary workflow 1s associated with a list of activities being performed by a worker of a plurality of workers, wherein each of the workers has an electronic device to receive the voice directed primary workflow, and wherein the electronic device is in communication with the server;

receiving, at the server, a surprise activity based on data received from a spill sensor, wherein the surprise activity is a high priority activity;

comparing, a context of each worker of the plurality of workers and a context of a current activity being performed by each worker to a context associated with the surprise activity;

performing, an analysis to identify a worker with a best fit context, wherein the analysis comprises of scoring each worker based on the context of the current activity being performed by each worker and the context associated with the surprise activity;

integrating, a voice directed secondary workflow comprising the surprise activity in the voice directed primary workflow, during an execution of the voice directed primary workflow, such that tasks related to the surprise activity are interleaved with list of activities corresponding to the voice directed primary workflow, wherein the voice directed primary workflow comprises the list of activities of the identified worker with a highest score, wherein the worker with highest score has the best fit context to perform the surprise activity;

transmitting, to the electronic device, the voice directed secondary workflow from the server;

receiving, at the server, a voice command from the worker via a microphone connected to the electronic device;

in response to receiving the voice command from the electronic device, assigning to the worker, the voice directed secondary workflow to perform the surprise activity based on a function of a current location of the worker, a training level of the worker, and an equipment carried by the worker, wherein on assignment, the server automatically shifts from the voice directed primary workflow to the voice directed secondary workflow; and receiving, at the server, a voice command from the worker via the microphone connected to the electronic device to shift from the voice directed secondary workflow having the surprise activity to the voice directed primary workflow, wherein the shifting directly returns the electronic device to a point in the voice directed primary workflow where the voice directed primary workflow was before the shifting to the voice directed secondary workflow.

2. The method of claim 1 wherein obtaining a list of activities being performed by the worker comprises obtaining multiple lists of activities for the plurality of workers, and wherein the integrating of the surprise activity is based on a best fit context of the plurality of workers.

3. The method of claim 2 wherein the context of the worker and the context of the surprise activity comprises a prioritization of activities in the list of activities being performed by the worker.

4. The method of claim 1 wherein the context of the worker and the context of the surprise activity comprises the current location of the worker and a location of the surprise activity.

5. The method of claim 4 wherein the worker closest to the location of the surprise activity is the worker selected for performing the surprise activity.

6. The method of claim 4 wherein the worker closest to the location of the surprise activity is the worker selected for performing the surprise activity if the context of the worker is indicative of the worker being qualified and having a required tool to perform the surprise activity.

7. The method of claim 4 wherein the context of the worker and the context of the surprise activity comprises the training level of the worker.

8. The method of claim 4 wherein the context and the context of the surprise activity comprises the equipment needed to accomplish the surprise activity.

9. The method of claim 1 comprising determining if deadlines for activities in the list of activities being performed by the worker will be missed if the surprise activity is integrated in the worker's list of activities.

10. The method of claim 9, comprising blocking the integration of the surprise activity in the worker's list of activities if a deadline will be missed.

11. The method of claim 1 wherein the context of the worker comprises the context at multiple remaining activities in the worker's list of activities, and wherein the surprise activity is interleaved after a future activity in the list of activities having a best fit context.

12. A system for facilitating execution of a workflow, the system comprising:
a server;
the server configured to:
obtain multiple voice directed primary workflows, wherein each voice directed primary workflow is associated with a list of activities being performed by a worker of a plurality of workers, wherein each of the workers has an electronic device to receive the voice directed primary workflow, and wherein the electronic device is in communication with the server;
receive a surprise activity based on data received from a spill sensor;
compare a context of each worker of the plurality of workers and a context of a current activity being performed by each worker to a context associated with the surprise activity;
perform, analysis to identify a worker with a best fit context, wherein the analysis comprises of scoring each worker based on the context of the current activity being performed by each worker, and the context associated with the surprise activity;
integrate a voice directed secondary workflow comprising the surprise activity in the voice directed primary workflow, such that tasks related to the surprise activity are interleaved with list of activities corresponding to the voice directed primary workflow, during an execution of the voice directed primary workflow, wherein the voice directed primary workflow comprises the list of activities of the worker with a highest score, wherein the worker with the highest score has the best fit context to perform the surprise activity; and
transmit, to the electronic device, the voice directed secondary workflow;
receive, at the server, a voice command from the worker via a microphone connected to the electronic device;
in response to receiving the voice command from the electronic device, assign to the worker, the voice directed secondary workflow to perform the surprise activity based on a function of a current location of the worker, a training level of the worker, and an equipment carried by the worker, wherein the server automatically shifts from the voice directed primary workflow to the voice directed secondary workflow; and
receive, a voice command from the worker via a headset connected to the electronic device to shift from the voice directed secondary workflow having the surprise activity to the voice directed primary workflow,
wherein the shifting directly returns the electronic device of the worker to a point in the voice directed primary workflow where the voice directed primary workflow was before the shifting to the voice directed secondary workflow.

13. The system of claim 12 wherein obtaining a list of activities being performed by the worker comprises obtaining multiple lists of activities for the plurality of workers, and wherein the integrating of the surprise activity is based on a best fit context of the plurality of workers.

14. The system of claim 13 wherein the context of the worker and the context of the surprise activity comprises locations of each worker and a location of the surprise activity, wherein the worker is the closest to the location of the surprise activity if the context of the worker is indicative of the worker being qualified and having a required tool to perform the surprise activity.

15. The system of claim 12 wherein the server determines if deadlines for activities in the list of activities being performed by the worker will be missed if the surprise activity is integrated in the worker's list of activities.

16. The system of claim 15, wherein the server blocks the integration of the surprise activity in the worker's list of activities if a deadline will be missed.

* * * * *